July 12, 1938.  W. O. DAILEY  2,123,274
COLLAR SUPPORT AND NECKTIE RETAINER
Filed Nov. 29, 1932  2 Sheets-Sheet 1
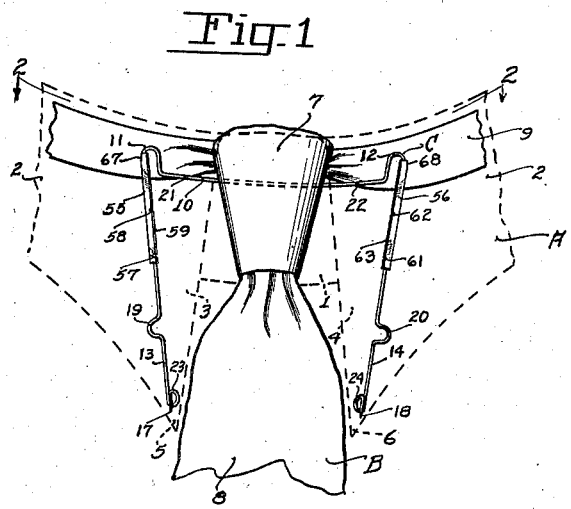
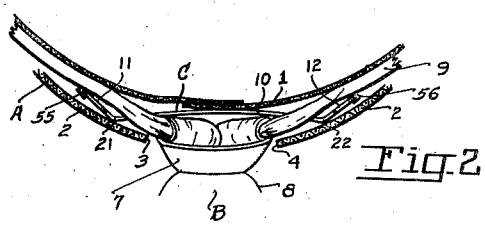
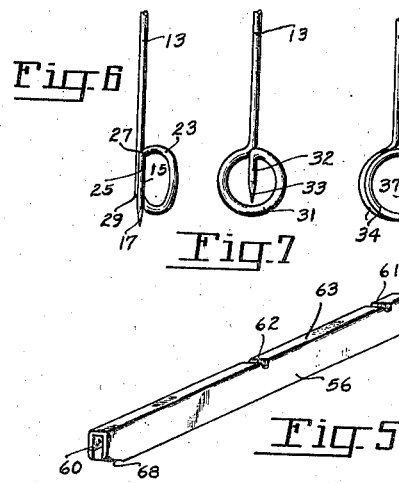
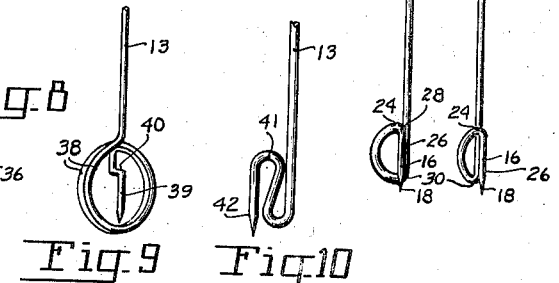
Inventor
William O. Dailey
By Samuel S. Jacobson
Attorney

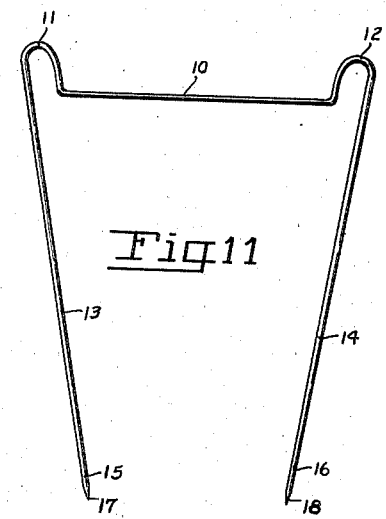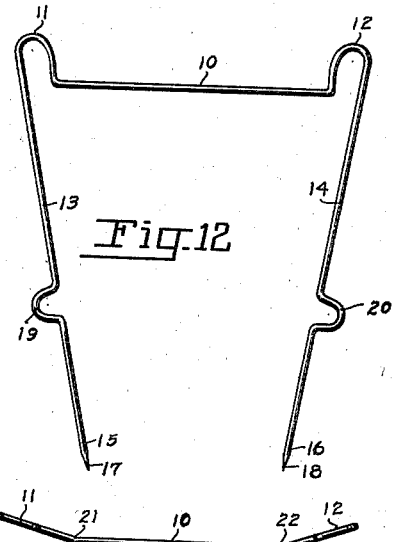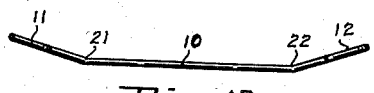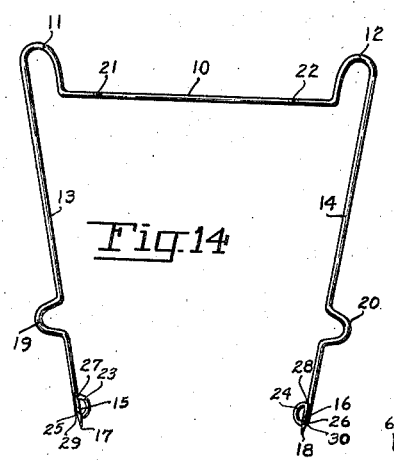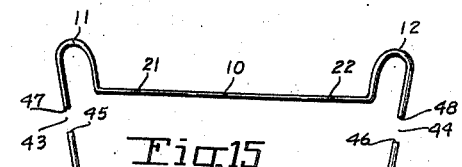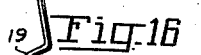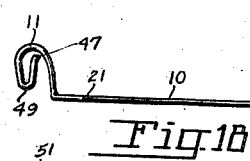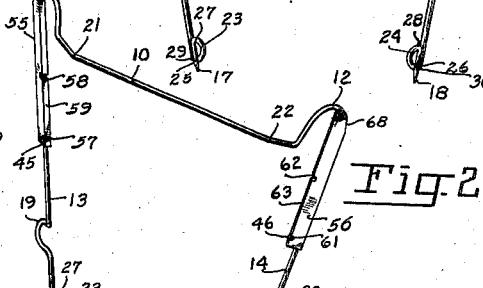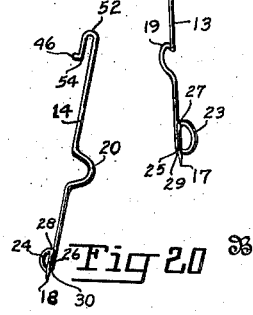

Patented July 12, 1938

2,123,274

UNITED STATES PATENT OFFICE 2,123,274

COLLAR SUPPORT AND NECKTIE RETAINER

William O. Dailey, Portland, Oreg.

Application November 29, 1932, Serial No. 644,800

20 Claims. (Cl. 24—87)

This invention relates generally to a flexible device formed to support a collar and retain a necktie in proper tailored relationship to the collar. The primary functions of the device embodying my invention are, in general, to hold the soft, pliable corners, points or wings of the collar in a neat and tailored condition, to maintain the neck-band of the collar in an upright position, and to retain the necktie in a proper elevated position and the knot of the necktie braced between the wings of the turned down portion of the collar to prevents its sagging downwardly.

Soft or semi-soft turned down collars are now extensively worn. These collars are usually provided with elongated points, corners or wings which extend downwardly and hang freely. Experience has shown that such collars, when worn, wrinkle easily, especially the wing, point or corner portions of the outer turned down portion of the collar. These wings, points or corners bend out of shape, wrinkle, and are subject to other undesirable flexing, so that the collar generally presents a displeasing appearance. The wearing of either the attached or collar band type of soft collar, therefore, presents a problem to the person who wears soft or semi-soft collars and who desires to look well groomed. Furthermore, experience has also shown that a necktie, unless properly supported, elevated and retained, has a tendency to slide and its knot to sag downwardly from proper position relative to the collar presenting an unsightly appearance and causing embarrassment and inconvenience to the person involved.

Many devices have been developed which are intended for maintaining the end portions of the outer fold of the collar in neat condition. Other devices have been developed for stiffening the end portions, and still others for preventing these end portions from spreading. However, my search of the prior art has failed to disclose a device which satisfies the objects sought to be fulfilled by my invention. My new and improved device embodying my invention stiffens the wings, prevents their spreading and maintains them in neat condition, and is capable of vertical adjustment, so that it may be used with different types of collars. My invention does away with the need for providing different devices for different heights of collars. The invention obviously eliminates the necessity of the jobber and dealer carrying on hand many sizes of devices for which there is likely to be a demand because of the varying dimensions of the wings of the collars now manufactured and sold.

Since the major part of my collar support and necktie retainer is formed of flexible materials, such as spring wire, resiliency is imparted, whenever required, to the downwardly extending legs, which hold the penetration-limiting-means, and to the transverse-bridge-member. This inherent resiliency in the material, from which the device embodying my invention is constructed, is desirable, since it forces the piercing points which are a continuation of my penetration limiting means to remain securely within the collar fabric and, consequently, there is not the slightest chance for them to accidentally slip out of the fabric and rub against the neck or shoulder and bruise or irritate them; nor is there any chance for the fabric into which the piercing points penetrate to creep or crawl on to the legs while they are under tension because the amount of their penetration is limited. The resiliency of the legs and cross-bar-member serves to yieldably resist movement of the collar support and necktie retainer laterally of the necktie band or vertically of the collar wings, and the device is prevented from being accidentally disengaged from the collar wings and thereby lose its effectiveness as a support and retainer.

Substantially all of the steps set forth in my United States Letters Patent No. 1,882,242 for an improvement in a "Method of making collar snubbers" may be followed in manufacturing my present invention and the major portion of the invention may be manufactured in accordance with the practice set forth in my United States Letters Patent No. 1,882,243 for an improvement in "Apparatus for forming and bending flexible materials". While I prefer to manufacture the invention set forth herein in accordance with the above identified Letters Patent, the invention may be manufactured by other apparatus and methods with equal facility, since all the invention contemplates is the forming, bending and cutting of flexible and other materials to form a collar support and necktie retainer. Any means and methods, suitable for producing the necessary legs, cross-members, sleeves, bends, crimps, loops and other members forming a part of the completed article of manufacture embodying the invention, may be used without deviating from the spirit of the invention.

The registered trade-mark "Collar snubber", No. 296,128, has been used by me to identify any article of manufacture constructed in accordance with my invention. Throughout the specification, the phrase "collar snubber" will be used to designate the competed article. In order to clarify the subsequent description of the invention, and to avoid any possibility of misinterpretation, the following definition of "collar snubber" is herein inserted. Unless otherwise specifically limited, the term "collar snubber" is herein employed generically to include all articles or devices made from flexible and other materials and used for maintaining the outer fold or portion of the collar in a smooth and tailored condition and the necktie knot snugly between the collar wings, allowing, at the same time, entire freedom of movement to the wearer, and includes such articles and devices as collar and/or necktie supports, adjusters, attachments, stays, stiffeners and retainers.

The invention relates more particularly to a device constructed from flexible and other materials consisting generally of a pair of shanks or legs having means for their engagement to the underside of the collar wings, corners or points in such manner that the wings, corners or points will not be wrinkled or in any way damaged, a transverse-bridge-piece or cross-bar having clamping means for engaging or lying against the necktie band on the front side thereof, and a pair of sleeve-members which are secured to the transverse-bridge-piece or cross-bar and with which the legs or extensions are adjustably and removably engaged.

Some of the important objects of my invention are to provide a collar support and necktie retainer, simple in design, that is made of flexible, light, inexpensive and durable materials; which prevents the points, wings or corners of a turned down collar from rolling upwardly or sliding apart excessively; which elevates the necktie and braces and maintains the knot of the necktie snugly between the collar wings at the junction of the neck-band and the turned down portion of the collar; which is sufficiently resilient to bend or give when downward pressure is applied to the upper portion or fold of the collar without adding any noticeable rigidity or destroying the natural comfortable flexibility of the collar, and to return to its normal taut but natural position when the pressure is released; which is entirely concealed from view when in use and can be readily applied to or removed from working engagement with the collar and necktie; and which is capable of being adjusted in height to adapt it for use with collars of different heights and wings of various dimensions.

Equally important objects of the invention reside in the provision of means for exerting a slight outward pressure to the necktie knot between the junction of the neck-band and turned down portion of the collar and thereby elevating the whole necktie, means adapted to penetrate the wings, points or corners of the collar for maintaining the wings, points or corners stressed, means for limiting the amount of penetration into the fabric of the collar, and means for maintaining the intermediate portions of the turned down collar, that is, the portions between the fold and the wings, under resilient tension.

These means are augmented by the fact that adjustability is present because of the inherent resiliency of the material from which the device is constructed and because of the positive inclusion of adjustable features. The device embodying my invention, therefore, can be engaged either at the points, wings or corners of the turned down collar or in their immediate vicinity depending, of course, upon the wishes of the wearer. The amount of tension or stress applied to the points and to the necktie is directly determined by the position of the device relative to the points or corners.

The invention is directed to other objects, possesses other features of novelty and advantage and consists in the new and useful provision, formation and construction of members and features, all of which will become readily apparent from the following detailed description having reference to the accompanying drawings which illustrate but one embodiment by which the invention may be realized and in which like reference characters refer to corresponding parts throughout the several views.

Figure 1 is a front view of a collar support and necktie retainer constructed in accordance with my invention illustrating its position when it is applied to a collar (fragmentary and in dotted lines) and to a necktie (fragmentary).

Figure 2 is a fragmentary, sectional, top, plan view taken on line 2—2 of Figure 1 looking in the direction indicated, illustrating the position of the transverse-bridge-piece and clamping-members when the device is applied to a collar and necktie.

Figure 3 is an enlarged fragmentary, front elevation of a part of the invention, showing one of the sleeve-members in section and the manner of securing the sleeve-member to the transverse-bridge-piece and the adjustable relationship between the leg and the sleeve-member.

Figure 4 is an enlarged fragmentary, side elevation of a part of the invention, showing one of the sleeve-members in section, taken on line 4—4 of Figure 3 looking in the direction indicated, and illustrating more graphically the manner of securing the sleeve-member to the clamping-members of the transverse-bridge-piece and the intimate sliding relationship between the leg or shank with the inside of the sleeve-member.

Figure 5 is a perspective, side view of one of the sleeve-members, which is a part of the invention, illustrating the position of the retaining-notches or grooves that are disposed within the sleeve-member and which communicate with the inside of the sleeve-member.

Figure 6 is a fragmentary, front view of the lower end of a leg whose end is pointed and which is formed to limit the penetration of said point into a fabric. The leg corresponds to the left leg of Figure 1 except that the penetration-limiting-means is slightly different.

Figure 7 is a fragmentary, front view of the lower end of another leg whose end is pointed and which is formed to limit the penetration of said point into a fabric. This leg also corresponds to the left leg of Figure 1 but has still another modified form of penetration-limiting-means.

Figure 8 is a fragmentary, perspective, front view of the lower end of still another leg whose end is pointed and which is formed to limit the penetration of said point into a fabric. This leg also corresponds to the left leg of Figure 1 but has still another modified form of penetration-limiting-means.

Figure 9 is a fragmentary, perspective, front view of the lower end of still another leg whose end is pointed and which is formed to limit the penetration of said point into a fabric. This leg also corresponds to the left leg of Figure 1 but it too has still another modified form of penetration-limiting-means.

Figure 10 is a fragmentary, side view of the lower end of still another leg whose end is pointed and which is formed to limit the penetration of the point into a fabric. This leg also corresponds to the left leg of Figure 1 but has still another modified form of penetration-limiting-means.

Figure 11 is a front, elevational view of a strand of flexible material from which a part of my device is constructed as it appears after the completion of the first stage in the construction of the device showing the clamping-members, transverse-bridge-member and legs partially formed.

Figure 12 is a front, elevational view of the strand of material shown in Figure 11 as it appears after the completion of the second stage in the construction of the device showing the crimps, loops or curved portions formed therein.

Figure 13 is a top view of the strand of flexible material shown in Figures 11 and 12 as it appears after the completion of the third stage in the construction of the device showing the bends or offsets which have been formed in the cross-bar.

Figure 14 is a front, elevational view of the strand of flexible material shown in Figures 11, 12 and 13 as it appears after the fourth stage in the construction of the device showing the preferred form of penetration-limiting-means that have been formed at the end of the leg portions.

Figures 15, 16 and 17 are front views of the strand of flexible material shown in Figure 14 after it has been severed into three different parts.

Figure 18 is a front view of the strand of flexible material shown in Figure 15 as it appears after the retaining-loops have been formed in the clamping-members of the transverse-bridge-member.

Figure 19 is a front, elevational view of the strand of flexible material shown in Figure 16 as it appears after the locking or retaining-member has been formed in the leg.

Figure 20 is a front, elevational view of the strand of flexible material shown in Figure 17 as it appears after its locking or retaining-member has been formed in the leg.

Figure 21 is a perspective, front view of the completed adjustable "collar snubber" ready for use in conjunction with a collar and necktie.

In order to more graphically show the position my "collar snubber" assumes when applied to a collar and necktie, there is shown in Figures 1 and 2 a portion of a fanciful collar, designated generally by reference character A, and a portion of a fanciful so-called four-in-hand necktie, designated generally by reference character B. It is obvious that a so-called bow necktie or any other type of necktie may be used without in any way destroying the effectiveness of the "collar snubber". There are numerous types of collars. Variations in the collars are generally accomplished by varying the length of the wings. In some types of collars the wings are elongated considerably and in others the wings are very narrow. But regardless of the amount of elongation of the wings, my "collar snubber" is capable of adjustment to meet these different conditions as will hereinafter be more specifically related. A completed "collar snubber", designated generally by reference character C, is shown in position when applied to the said collar and necktie. It is important to note that all descriptive expressions hereinafter to be used must be interpreted with reference to the position the "collar snubber" occupies when in actual use.

The collar consists, in general, of a neck-band or inner-fold-portion 1. This neck-band-portion 1 may be removably attached to or may be an integral part of a shirt (not shown). A turned-down, outer-fold or flap-portion 2 is connected to or is an integral part of the neck-band-portion 1. The outer-fold-portion 2 has wings 3 and 4 which are spaced apart from each other. The wings 3 and 4 terminate in points 5 and 6 respectively. The points need not necessarily be angular in form but may be rounded. The necktie illustrated has, in general, a knot 7, a flowing-portion 8 and a neck-band or bight-portion 9 which is placed between and intimately engages the inner-fold or neck-band-portion 1 and the outer-fold or turned-down-portion 2 of the collar.

The "collar snubber", generally designated by reference character C, may be constructed from any flexible material which is strong, durable, light in weight and which has inherent resiliency. I have found, after much experimentation, that steel spring wire of a fine gauge, such as piano wire, satisfies most all of the above requirements and, therefore, I preferably construct the "collar snubber" from such material. The material may be cut to the desired length as the "collar snubber" is being manufactured or it may be cut into the required lengths before being formed into "collar snubbers". In accordance with my present and preferred practice I have the material cut to the desired length before the "collar snubber" is formed. These standard cut lengths of flexible material are taken from stock after the ends have already been pointed. The material is bent into a general inverted U-shaped form. In this manner is created a transverse-bridge-member, such as an elongated-cross bar 10, a pair of retaining-members, such as inverted U-shaped loops or fingers 11 and 12 which extend upwardly from the extreme ends of the elongated-cross-bar and a pair of legs or stems 13 and 14 which extend downwardly from the retaining-members (see Figure 11). It may be readily seen by viewing Figures 1, 11, 12 and 21 that the legs tend to slightly converge toward each other. In this manner the wings of the collar are pulled toward each other and are prevented from spreading apart excessively. Mention should here be made that the length of the cross-bar can be varied to satisfy the type of ties in fashion by using a longer strand of material or by adding an adjustable feature thereto.

The free or lower-ends 15 and 16 of the legs or stems 13 and 14 are sharply pointed as indicated by reference characters 17 and 18. The pointed-ends 15 and 16 are, therefore, able to pierce the collar fabric and penetrate thereinto to a limited depth as will hereinafter be more specifically related.

The elongated-cross-bar 10 has bends 21 and 22 formed therein near its extreme ends but slightly spaced from the inverted-U-shaped retaining or clamping-loops 11 and 12. In this manner the inverted-U-shaped retaining-loops are placed at slightly oblique angles to the vertical plane that passes through the cross-bar and further, the cross-bar 10 is made to extend forwardly of the longitudinal plane which passes through the legs. This arrangement is most graphically shown in Figures 2, 13 and 21. In this manner the "collar snubber" is made to effectively conform to the normal curvature of the collar neckband portion and it also permits the cross-bar to be placed under slight tension when the knot of the necktie bears thereupon and also causes this tension to be transferred to the retaining-loops which lie upon the neckband of the necktie.

This bearing cooperation between the cross-bar and retaining-loops is very essential to the successful and effective operation of the "collar snubber".

It should be further noted that when the "collar snubber" is in place, so that the retaining-loops lie upon the neck-band of the nectie and the sharpened points are securely held within the fabric of the collar, the legs 13 and 14 are in effect trusses for the collar wings and brace them, so that the "collar snubber" is maintained fixedly secured relative to the necktie and collar, so that it does not shift laterally on the neck-band of the necktie and in turn this prevents the necktie knot from shifting laterally.

The cross-bar may have a seat for the knot portion of the collar or it may have a loop to engage with a collar button or it may have any other configuration therein in order to meet changes in custom or fashion. However, the preferred embodiment consists of a straight transverse-bridge-member.

Any number of laterally curved portions, such as crimps, bends, circular or semi-circular-loops 19 and 20 may be formed intermediate or near the lower ends of the legs 13 and 14. These crimps or loops lie in the same planes as the upwardly-directly inverted-U-shaped-retaining-loops 11 and 12 in order that they might not interfere with the normal comfortable unrigid appearance of the collar. Not only do these curved portions tend to increase the resiliency of the legs, but they also serve as hand grips to assist one in attaching or removing the "collar snubber".

In order to prevent the piercing-points 17 and 18 from puncturing the outer fabric of the turned-down-portion 2 of the collar, there is provided penetration-limiting-members, such as loops 23 and 24 immediately adjacent the piercing tongues. These penetration-limiting-members are formed from and are a part of the free-ends of the legs and may be variously formed as indicated by Figures 6 to 10 inclusive and which will be more specifically described forthwith. Each embodiment of the penetration-limiting-members herewith presented performs, in a great measure, substantially the same functions as the preferred embodiment shown in Figures 1 and 21 and related figures. Experience has taught me that the most effective results can best be obtained by the embodiment shown in the above designated figures and by the slightly different embodiment shown in Figure 6. When the loops 23 and 24 are formed, those portions of the free-ends 15 and 16 of the legs having the sharp-piercing-points 17 and 18 are, in effect, prongs or tongues as shown at 25 and 26. The prongs or tongues are formed and project slightly outwardly from the penetration-limiting-loops 23 and 24.

Sharp-stop-bends 27 and 28 are formed in the loops 23 and 24 at a point from where the prongs or tongues 25 and 26 emanate. These bends, formed at the junction of the prongs 25 and 26 with the loops 23 and 24, act as stops and limit the amount of penetration into the collar fabric which the prongs can make and, if desired, solder may be applied at the junction of the prongs and loops and in this manner positively prevent the fabric from traveling up on to the legs. The prongs are in substantially parallel alignment with the legs 13 and 14 but are very slightly spaced therefrom. The piercing-points 17 and 18 extend slightly below the sharp-bends 29 and 30 formed at a point from where the loops 23 and 24 emanate from the legs 13 and 14. The penetration-limiting-members 23 and 24 are placed at very slightly oblique angles to the longitudinal plane which passes through the legs. By this construction the corners or points 5 and 6 of the turned-down-portion 2 of the collar are prevented from "twisting" and becoming contorted in any other way, when the piercing-prongs 25 and 26 are inserted into the underside of the wings of the turned-down-portion 2 of the collar. This construction and arrangement is most graphically shown in Figures 1 and 21.

In Figure 6 is shown a slightly different modification of the penetration-limiting-members which may be used with equal facility in putting my invention in practice. The only distinction between this embodiment and the preferred embodiment already described (see Figures 1, 21 and others) lies in the shape of the bends 29 and 30 that are formed at the junction of the legs 13 and 14 with the penetration-limiting-loops 23 and 24. The embodiment in Figure 6 shows bend 29 less sharp and the bend on the other modified leg (not shown) is also less sharp than the bends shown in the preferred penetration-limiting-members already described. This arrangement has the effect of making the piercing-points 17 and 18 extend a little farther below the bends 29 and 30 and, therefore, allows greater ease for inserting the prongs 25 and 26 into the collar fabric.

In Figure 7 is shown another modification of the penetration-limiting-members. In this embodiment there are formed circular-loops 31 at the lower ends of the legs 13 and 14 having tongues 32 emanating therefrom which terminate in sharp-piercing-points 33. This arrangement functions substantially in the same manner as the preferred embodiment.

In Figure 8 is shown still another modification of the penetration-limiting-members. In this embodiment there are formed coils 34 at the lower ends of the legs 13 and 14. These coils consist generally of two circular loops, the outer one of which has prongs 36 emanating therefrom which terminate in sharp-piercing-ends 37. The prongs 36 may be fixedly secured to the coils 34 by solder. When the prongs are soldered to the coils, all chances for the fabric, into which the piercing points penetrate, to get entangled in the coils is positively eliminated.

In Figure 9 is shown still another modification of the penetration-limiting-members. In this embodiment there are also formed coils 38 at the lower ends of the legs 13 and 14 having sharpened-tongues 39 emanating from the rear loop from which the coils are constructed. The sharpened-tongues 39 pass through the opening formed by the coils. In order to place the piercing-tongues 39 in front of and in spaced relationship with the front loop of the coils 38, offsets 40 are formed in the piercing-tongues 39.

In Figure 10 is shown still another modification of the penetration-limiting-members. In this embodiment the free ends of the legs 13 and 14 are formed into S-shaped-members 41 from which emanates sharpened-tongues 42.

All of these modified embodiments intend to perform substantially the same functions, namely to limit the penetration of the pointed-tongues or prongs into the collar fabric, to prevent any possibility of the fabric creeping or crawling past the tongues and resulting in the device becoming entangled therein, and to materially aid in easily and quickly attaching or detaching the "collar snubber" without fear that the prongs or tongues will injure the collar fabric or the wearer. It is important to note that in all the embodiments of the penetration-limiting-members except that shown in Figure 10, the loops or coils are formed inwardly with respect to the legs. This is essential in order to prevent any possibility of the fabric getting entangled in the penetration-limiting-members.

The detailed description hereinbefore set forth described in a precise manner the formation of a non-adjustable "collar snubber". This description of the "collar snubber" complies, in general, with the description of the invention set forth in my United States application for an improvement in a "Spring wire collar snubber", Serial No. 367,507, to which attention has been heretofore called. The description to follow will relate in detail the preferred manner of making the "collar snubber" adjustable.

The legs 13 and 14 are cut as shown at 43 and 44 causing the upper-ends 45 and 46 of legs 13 and 14 respectively and the free-ends 47 and 48 of retaining-loops 11 and 12 respectively to be jagged. (See Figures 15, 16 and 17).

Bends 49 and 50 are formed within the free-ends 47 and 48 respectively of the retaining-loops, so that the free-ends are disposed as shown in Figure 18. Bends 51 and 52 are formed within the free-ends 45 and 46 respectively of the legs; and bends 53 and 54 are formed immediately behind the free-ends 45 and 46 respectively, so that the free-ends are disposed as shown in Figures 19 and 20.

Adjusting-members, such as rectangular-sleeves, designated generally by reference characters 55 and 56, are fixedly clamped to the free portions of retaining-loops 11 and 12 respectively in the manner shown in detail in Figures 3 and 4. These adjusting-members may be constructed of any material which is strong, durable and light in weight. I have found that sheet metal of fine gauge, such as tin, satisfies most all of the above requirements; but I do not wish to be limited to sheet metal as seamed or seamless tubing of proper consistency may be used with equal facility. The sleeve-member 55 has retaining-grooves or locking-notches 57 and 58 disposed within side-wall 59. These grooves or notches communicate with the hollow-interior 60 of sleeve-member 55. The sleeve-member 56 has corresponding retaining-grooves or locking-notches 61 and 62 disposed within corresponding side-wall 63. These retaining-grooves also communicate with the hollow-interior 60 of the corresponding sleeve-member 56. The area of the hollow-interior 60 of each of the sleeves is very slightly greater than the overall thickness of the material from which the legs 13 and 14 are constructed (see Figure 4). This arrangement, as it will become more apparent, prevents any material side movement of the legs 13 and 14 relative to the sleeve-members 55 and 56.

Referring to Figures 3 and 4, showing the sleeve-member 56, retaining-loop 12 and leg 14 enlarged, the upper-end 64 of the sleeve-member 56 is clamped about the free end of the retaining-loop 12 as shown at 65 and 66, so that the jagged-end 48 of leg 14 intimately contacts the inner portion of the side-wall 63 of the sleeve-member 56. By forming bends 49 and 50 in the free ends of each of the retaining-loops 11 and 12 resistance is offered when the sleeve-member is forcibly clamped about the free ends of the retaining-loops by the tension created. It is this frictional engagement of the sleeve about the free end of the retaining-loop 12 and the frictional engagement of the jagged-end 48 against the side-wall 63 which maintains the sleeve-member 56 fixedly in position relative to the retaining-loop 12. The upper portion of the sleeve-members is bent or removed as shown at 67 and 68. This not only adds materially in maintaining the sleeve-members fixedly secured to their respective retaining-loops 11 and 12, but also makes the upper portion of each of the sleeve-members conform to the contour of the retaining-loops 11 and 12. Sleeve-member 55 is clamped on and retained about retaining-loop 11 in the same manner and produces the same results and, therefore, no further description is thought necessary.

Attention is called to the fact that substantially the same results may be obtained if the sleeve-members 55 and 56 were fixedly secured to the legs 13 and 14 and the loops or fingers 11 and 12 of the transverse-bridge-member were capable of adjustment relative to the sleeve-members. Therefore, the above description should not be considered a limitation but an example of preferable construction.

Leg 13 is adapted for being slidably inserted within sleeve 55 and leg 14 is adapted to be slidably inserted within sleeve 56. Figures 3 and 4 show, enlarged, the relationship between sleeve 56 and leg 14. Since both legs are identical in structure and function in like manner, it is believed unnecessary to describe in detail the exact and precise manner in which each of the legs 13 and 14 functions in conjunction with their respective sleeves. The description of the relationship between the sleeve 56 and leg 14 will be detailed and will, it is believed, suffice for the description of the relationship between sleeve 55 and leg 13. The bend 52 formed within the upper portion of leg 14 offers a tensioning resistance when the leg is inserted in sleeve 56 as clearly shown in Figure 3. By constructing the legs in the manner heretofore described, bearing surfaces are created upon the upper portion of the legs. It is apparent from viewing Figure 3 that the leg 14 may be moved very slightly in a lateral direction but only against the tension created by bend 52. As stated before, there can be very little side movement of the legs because of the slight area in which the leg is made to slide. The leg 14 can only be inserted into the hollow-interior of the sleeve 56, so that the free-end 46 is in direct alignment with the retaining or locking-notches or grooves 61 and 62. When the free-end 46 is placed in registerable alignment with either of the locking-notches 61 or 62 it enters therein by virtue of the tension created by the bend 52. In this manner the leg 14 is maintained in a substantially fixed position relative to the sleeve 56 and will remain in such position until the free-end 46 is disengaged from either of the locking-notches 61 or 62. It is apparent that when the free-end 46 is made to engage with the locking-notch 62 the distance between the upper surface of the retaining-loop 12 and the piercing-point 13 is materially less than the distance between the same points, when the free-end 46 is engaged in locking-notch 61. It is in this manner that vertical adjustment is imparted to the legs 13 and 14. It is obvious that the sleeve may be made as long as desired and may have as many locking-notches as are deemed necessary for the proper adjustment of the "collar snubber". Figure 5 shows an enlarged view of the sleeve-member 56 and sleeve-member 55 is identical in structure. It is obvious that the adjusting-members may be soldered to the retaining-loops 11 and 12 or may even be made an integral part of the cross-bar and retaining-loops provided a different type of material is used.

While the sleeve members illustrated and described contain a number of locking-notches, it is apparent that vertical adjustment between the sleeves and legs may be obtained with equal, if not greater facility, by entirely eliminating from the sleeve members the locking-notches and allowing the frictional and tensioning resistance of the bends 51 and 52 and free ends 45 and 46 of legs 13 and 14 respectively to hold the legs against the inner wall of the sleeve-members and in this manner permit their vertical adjustment and yet allow them to be held in relatively fixed positions against the sleeve-members.

And further, while the sleeve-members 55 and 56 are described and shown as fixedly secured to the inverted-U-shaped-retaining-loops 11 and 12, no material change in construction would be required nor would the results be different, if the sleeve-members were fixedly secured to the legs 13 and 14 and the free ends of the retaining-loops 11 and 12 were adjustable relative to the sleeve-member. Consequently, the former description should only be taken as an example of the preferred construction.

In applying my "collar snubber" to a collar and necktie the cross-bar is placed underneath the necktie and behind the knot of the necktie and the clamping-joints or upwardly-directed-retaining-loops engage and lie upon the outside of the neck-band of the necktie between the folds of the collar. The sharpened ends or prongs or tongues of the legs are inserted into and penetrate the inner fabric of the turned-down-fold 2 of the collar to a limited extent so as not to penetrate clear through the outer fabric. The upwardly directed bends or clamping-loops contribute to the flexibility of the legs as well as maintain the "collar snubber" in a relatively fixed position with respect to the necktie and collar. Since the device is made of relatively light spring materials and is entirely concealed behind the necktie and outer fold of the collar, the collar and necktie take a normal comfortable position at all times. There is sufficient strength and stiffness in the legs to maintain the prongs securely within the fabric without affecting the normal desired position of the collar and necktie and to maintain the cross-bar in fixed position and provide a strong support for the necktie knot bracing and holding it snugly in place and preventing its slipping downwardly.

From the foregoing description it will undoubtedly appear that the invention as described satisfies the objects set forth herein. The invention has been described in connection with a specific illustrated embodiment disclosing a definite arrangement of parts. However, it should be understood that many variants thereof are possible to those skilled in the art. The invention, therefore, in its broader aspect, is not limited to the specific construction herein shown and described, as changes and alterations may be made in the sizes, proportions, configurations, and arrangements of the various parts without departing from the broad spirit of this invention.

Having thus described my invention, what I claim as new and upon which I desire to secure Letters Patent is:

1. A collar support and necktie retainer, comprising a pair of converging resilient legs having a pair of forwardly extending piercing points adapted to penetrate the collar fabric, penetration limiting means formed within the legs immediately adjacent the piercing points adapted to limit the penetration of the piercing points into the collar fabric, a transverse bridge member, inverted U-shaped retaining means terminating the extreme ends of said transverse bridge member, and adjustable means secured to said retaining means and having the legs slidably inserted therein, said legs adapted for vertical adjustment relative to said means.

2. A device as characterized in claim 1, including curved portions formed in the legs for increasing their resiliency and for facilitating the manipulation of the device.

3. A device as characterized in claim 1 wherein the penetration limiting means is adapted to prevent the fabric of the collar wings from creeping or crawling upon the legs thus preventing the wrinkling of the wings.

4. A collar support and necktie retainer, comprising a central portion, inverted U-shaped retaining loops formed at the extreme ends of said central portion, said central portion extending forwardly from said loops, a pair of legs, a pair of prongs extending from said legs adapted to penetrate the collar fabric, means formed within the legs for limiting the amount of penetration of said prongs within the collar fabric, curved portions formed within each of the legs to increase their resiliency and adjustable means secured to the U-shaped retaining loops and legs said legs being slidably inserted and adjusted relative to said adjustable means.

5. A device for supporting collars and retaining neckties, including a cross-bar to underlie the necktie knot, retaining loops formed at the respective terminals of and extending above the cross-bar adapted to lie upon and in front of the band of the necktie on each side of the necktie knot, a pair of legs, the terminals of which are formed into piercing points that are adapted to engage the wings of and adjacent the points of the outer fold of the collar, means for limiting the amount of penetration of the piercing points, and adjustable means secured to the retaining loops and legs, said legs being slidably movable in said adjustable means for adjustably positioning the legs relative to the cross-bar.

6. A device for supporting collars and retaining neckties, including a forwardly extending central portion to underlie the necktie knot, inverted U-shaped loops provided at the respective ends of and extending directly above the central portion, said inverted U-shaped loops adapted to engage the necktie at each side of the necktie knot, adjusting members secured to the inverted U-shaped loops, legs slidably disposed within and downwardly extending below the adjusting members to form collar wing supporting legs, said collar wing supporting legs being projected in converging relation to each other, the terminals of the legs being provided with piercing points to engage the points of the collar wings, the legs adjacent the piercing points being formed to limit their penetration within the collar fabric, said legs being adapted for vertical adjustment relative to the adjusting members.

7. In a device of the class described, comprising a central portion adapted to be disposed beneath the knot of the necktie, retaining loops at the extreme ends of the central portion, rectangular sleeves secured to the retaining loops, legs slidably mounted within and projecting from the lower ends of said sleeves, said legs converging toward each other and having their terminals pointed in order to engage the fabric of the collar wings, said legs being vertically adjustable within the sleeves, and means for substantially locating said legs against movement relative to said sleeves.

8. A device of a general inverted U-shaped form adapted to be used in combination with a collar and necktie, a cross bar adapted to lie beneath the necktie knot, a pair of retaining loops formed at the extreme ends of the cross bar and extending abruptly upwardly therefrom, said cross bar extending outwardly and adapted to engage and thrust against the knot of the necktie, sleeve members secured to the retaining loops, legs slidably mounted within said sleeves and vertically adjustable relative thereto, said legs terminating in piercing members adapted to engage the lower ends of the points of the collar wings, and means to limit the amount of penetration of said piercing members, the device when in position adapted to exert a thrust between the knot of the necktie and the points of the collar.

9. A device of the class described, comprising a central portion designed to underlie the knot of the necktie, the ends of the central portion being directed upwardly at a substantially right angle to the plane of the central portion and formed in a return bend to create retaining loops, a pair of legs, the terminals of which are sharpened, the legs immediately adjacent said terminals being shaped to limit the penetration of said terminals into the collar fabric, rectangular sleeves secured to the retaining loops and into which said legs slidably move, means for locking said legs relative to said rectangular sleeves; the plane of the central portions being in its main length substantially in advance of the plane of the legs when considering the device in position of use, the retaining loops serving to bear on the neck band of the necktie immediately beyond the knot under a pressure incident to the bearing of the knot on the central portion, the length of the legs permitting the sharpened terminals thereof to engage the wings of the collar and exert a thrust between the knot of the necktie and points of the collar wings and thereby hold such wings in a substantially smooth position.

10. An attachment of the class described comprising a pair of legs provided with coils adjacent their sharpened ends to engage the collar points and prevent the fabric from traveling between the coils, said sharpened ends being offset from and lying in front of the coils, a transverse-bridge member removably secured to the legs, retaining means formed at the extremities of and projecting above the member to engage the fold of the collar, and removable securing means attached to the retaining means and legs whereby the transverse bridge member is secured to the legs.

11. An attachment for collars of the class described comprising a transverse-bridge-member provided with retaining loops at its ends, resilient legs extending from said retaining loops which have piercing elements at their extremities, convolutions disposed upon the legs adjacent the piercing elements, means for preventing the collar fabric from working between the convolutions, said means including offset portions in the legs between the piercing elements and convolutions, said legs being vertically adjustable relative to the transverse-bridge member, and adjustable means for vertically adjusting the legs with respect to the transverse bridge member.

12. In a collar support and necktie retainer, a transverse-bridge member including retaining loops at its ends, adjustable legs having piercing points at their extremities for engagement with the collar points, said adjustable legs depending from said retaining loops, loops in said legs adjacent the piercing points, and means on said legs for preventing the creeping or crawling of the collar fabric between the said loops.

13. An attachment of the class described comprising a substantially U-shaped body element comprising, a cross bar including extended portions at opposite ends thereof, sleeve members connected to said extended end portions forming parts of the leg members, and resilient members mounted within said sleeve members forming the remaining portions of said leg members.

14. A device as characterized in claim 13 including means incorporated within the resilient members for permitting their vertical adjustment with respect to the sleeve members.

15. A device as characterized in claim 13 including means incorporated within the resilient members for inserting their free ends within the collar wings.

16. An attachment of the class described comprising, a pair of legs, penetration means disposed adjacent each of the legs, said means having two forwardly extending tongues which constitute the penetration means engageable to and retained within the points of a collar, means adjacent the penetration means for limiting the amount of penetration, a transverse bridge member removably secured to the legs, U-shaped retaining means incorporated within and at the extremities of the transverse bridge member, said retaining means projecting upwardly from the remaining portion of the bridge member and lying in substantially the same plane in which the legs lie, and means secured to said retaining means and cooperating with said legs whereby said legs may be adjusted relative to said transverse bridge member.

17. An attachment of the class described comprising, a body element consisting of a transverse bridge member including upwardly projecting portions at opposite ends of said bridge member, sleeve members connected to said projecting portions forming parts of leg members, resilient members mounted within said sleeve members forming the remaining portions of said leg members, piercing means incorporated within the resilient members for inserting their free ends within a collar, and means incorporated within the resilient members and adjacent the piercing means for limiting the penetration of said free ends of the resilient members.

18. A collar stay for use on collar wings comprising a substantially U-shaped member providing a cross bar with parallelly extended portions at opposite ends thereof, tubular members having connection with the ends of said portions, leg elements mounted for longitudinal movement in the tubular members and having means cooperating with the tubular members to prevent detachment therefrom and said leg members being provided with means for connection with the point of a collar wing.

19. A collar stay for use on collar wings comprising a substantially U-shaped member providing a cross bar with parallelly extended portions at opposite ends thereof, tubular members having connection with the ends of said portions, leg elements mounted for longitudinal movement in the tubular members and having means cooperating with the tubular members to prevent detachment therefrom.

20. A collar stay comprising a leg portion, the upper end of which is being adapted to engage a collar at the fold line thereof, a tubular member having connection with the lower end of said leg portion, a leg element having a portion thereof slidably arranged in the tubular member and provided with means cooperating with the tubular member to prevent detachment of the leg element from said tubular member and said leg element being provided with collar penetrating means.

WILLIAM O. DAILEY.